US006114624A

United States Patent [19]

Ghafourian et al.

[11] Patent Number: 6,114,624

[45] Date of Patent: Sep. 5, 2000

[54] PADMOUNTED DISTRIBUTION TRANSFORMER TANK

[75] Inventors: Ali A. Ghafourian, Athens, Ga.; Herb Adkins, Vienna, Mo.

[73] Assignee: ABB Power T&D Company Inc., Raleigh, N.C.

[21] Appl. No.: 09/157,787

[22] Filed: Sep. 21, 1998

[51] Int. Cl.[7] .......... H02G 3/08

[52] U.S. Cl. .......... 174/50

[58] Field of Search .......... 174/50, 17 R, 174/66; 220/3.8, 3.92, 3.94, 4.02, 210, 327, 328, 241; 336/65, 66, 67, 40, 105; 312/111, 222

[56] References Cited

U.S. PATENT DOCUMENTS

| | | | |
|---|---|---|---|
| 3,895,179 | 7/1975 | Wyatt | 174/50 |
| 4,045,989 | 9/1977 | Ryan | 72/133 |
| 4,469,269 | 9/1984 | Ito et al. | 228/173 |
| 4,533,786 | 8/1985 | Borgmeyer et al. | 174/50 |
| 4,556,758 | 12/1985 | Warden | 174/50 |
| 4,559,699 | 12/1985 | Owen et al. | 29/602 R |
| 4,738,191 | 4/1988 | Porter | 98/121.1 |
| 4,745,966 | 5/1988 | Avery | 165/104.33 |
| 4,915,023 | 4/1990 | Porter | 98/121.1 |
| 5,527,988 | 6/1996 | Hernandez et al. | 174/17 LF |
| 5,573,319 | 11/1996 | Dirk | 312/100 |
| 5,739,464 | 4/1998 | Adkins et al. | 174/50 |
| 5,783,775 | 7/1998 | Marusinec | 174/50 |

*Primary Examiner*—Dean A. Reichard

*Attorney, Agent, or Firm*—Woodcock Washburn Kurtz Mackiewicz & Norris LLP

[57] ABSTRACT

A padmounted distribution transformer tank is disclosed wherein hem-bend flanges are constructed upper edge of the front terminal panel to act as a heat shield to protect the painted surface during the welding operation on the cover. Hem-bend flanges are also utilized on the sidewalls of the tank to improve the structural strength of the tank flange.

5 Claims, 3 Drawing Sheets

PADMOUNTED DISTRIBUTION TRANSFORMER TANK

BACKGROUND OF THE INVENTION

1. Field of the Invention

The present invention relates to padmounted electrical distribution transformers and in particular to a tank for such transformers.

2. Description of the Prior Art

A transformer tank is designed to house a transformer electrical core and coils. Conventional tanks are formed in the shape of rectangular cube and comprise four vertical sidewalls, a horizontal top wall, hereinafter referred to as a tank cover, and a horizontal bottom wall. During the assembly, five of the walls are preassembled together by welding, leaving an opening to permit subsequent insertion of the core and coil assembly. Normally the opening is provided at the top, although in some cases it can be provided at one of the sides. After the open tank has been tested for leaks and coated with a corrosion resistant paint, the transformer core and coil assembly is placed inside the tank through the top. The tank is then filled with oil and the top wall, the tank cover, is placed on flanges formed by bent upper ends on each of the side panels and is welded in place. During the cover welding operation, the heat generated by the weld is high enough so as to possibly damage or even burn the coated surfaces of the tank flange which will require additional repair work. The prior art technique for protecting the painted surface from the heat during the welding operation is disclosed in U.S. Pat. No. 4,559,699—Owen et al. In that patent it will be noted that an extra steel bar is welded to the tank flange to act as a heat shield when the tank cover is welded in place on the tank. This is a very expensive process in manufacturing transformer tanks.

It would be desirable to eliminate the extra operation of welding a steel bar to the tank flange so as to reduce the manufacturing costs.

SUMMARY OF THE INVENTION

It is an object of the present invention to provide a method of constructing a top-loaded tank for a padmounted distribution transformer wherein the necessity of welding a separate bar to the tank flange is eliminated. It is a further object of the invention to fabricate the tank flange in such a manner as to provide a heat shield or heat sink which will protect the painted surface from any paint damage during welding. It is a further object of the invention to fabricate the tank flange with a flange folded over itself into a hem-bend design which will act as a heat sink and will protect the painted surface from any paint damage during welding and also increase the structural strength of the tank flanges.

In accordance with one aspect of the invention there is provided a method of constructing a top-loaded tank for a padmounted distribution transformer having terminals on the outer surface of the recessed terminal wall and a pair of sidewalls connected to the terminal wall. The method includes the steps of forming the terminal wall of the tank with a hem-bend flange extending along the top edge of the wall, the hem-bend comprising two layers of wall material folded together and extending perpendicular to the terminal wall. The upper layer of the hem-bend flange has a width greater than the lower layer and extends to the opposite side of the terminal wall from the hem-bend flange. The method further includes assembling tank components including the terminal wall and the pair of sidewalls each including a hem-bend flange extending along the edge thereof adjacent the outer surface of the terminal wall, the hem-bend flange on the sidewalls comprising two layers of wall material folded together with the edge of one of the layers engaging the outer surface of the terminal wall to provide a tank having an opening at its upper end. The method further includes welding a tank bottom to the lower end thereof, painting the tank, attaching components to the terminal wall, including electrical terminals, placing a core-coil assembly and liquid dielectric in the tank, and welding a tank cover to the upper layer of the hem-bend flange on the terminal wall wherein the lower layer of the hem-bend flange provides a heatsink for the welded joint to protect the painted surface from the heat during the welding operation.

In a further aspect of the invention the hem-bend flange on the terminal wall projects into the inside of the transformer tank and the upper layer of the hem-bend flange extends outside of the transformer tank beyond the outer surface of the terminal wall to provide the recess for the terminal wall.

In another aspect of the invention the hem-bend flange on the terminal wall extends outside of the transformer tank beyond the outer surface of the terminal wall and the upper layer of the hem-bend flange extends inside the transformer tank, the hem-bend flange outside of the transformer tank providing the recess for the terminal wall.

In a further aspect of the invention there is provided in a padmounted distribution transformer including a top-loaded tank having terminals on the outer surface of a recessed terminal wall, the improvement wherein the terminal wall of the tank has a hem-bend forming a flange extending along the top edge of the wall, the hem-bend comprising two layers of wall material bolted together and extending perpendicular to the terminal wall, the upper layer of the hem-bend having a width greater than the lower layer and extending to the opposite side of the terminal wall from the hem-bend, and a tank cover welded to the upper layer of the hem-bend wherein the lower layer of the hem-bend provides a heat-sink for the welded joint. In one aspect of the invention, the hem-bend projects into the inside of the transformer tank and the upper layer of the hem-bend extends outside of the transformer tank beyond the outer surface of the terminal wall. In another aspect of the invention, the hembend extends outside of the transformer tank beyond the outer surface of the terminal wall and the upper layer of the hem-bend extends inside of the transformer tank.

In a further aspect of the invention the top-loaded tank includes a pair of sidewalls, connected to the terminal wall, and at least one of the sidewalls including a hembend forming a flange extending along the edge thereof adjacent the terminal wall, the hembend on the sidewall comprising two layers of wall material folded together with the edge of one of the layers engaging the outer surface of the terminal wall wherein the hem-bends increase the structural strength of the tank flanges. In a further aspect of the invention, both of the sidewalls of the tank include a hem-bend having an edge engaging the outer surface of the terminal wall.

BRIEF DESCRIPTION OF THE DRAWINGS

For a more detailed understanding of the invention and for illustration of various forms thereof, reference is to be made to the accompanying drawings.

DESCRIPTION OF THE PREFERRED EMBODIMENT

Figure 1:
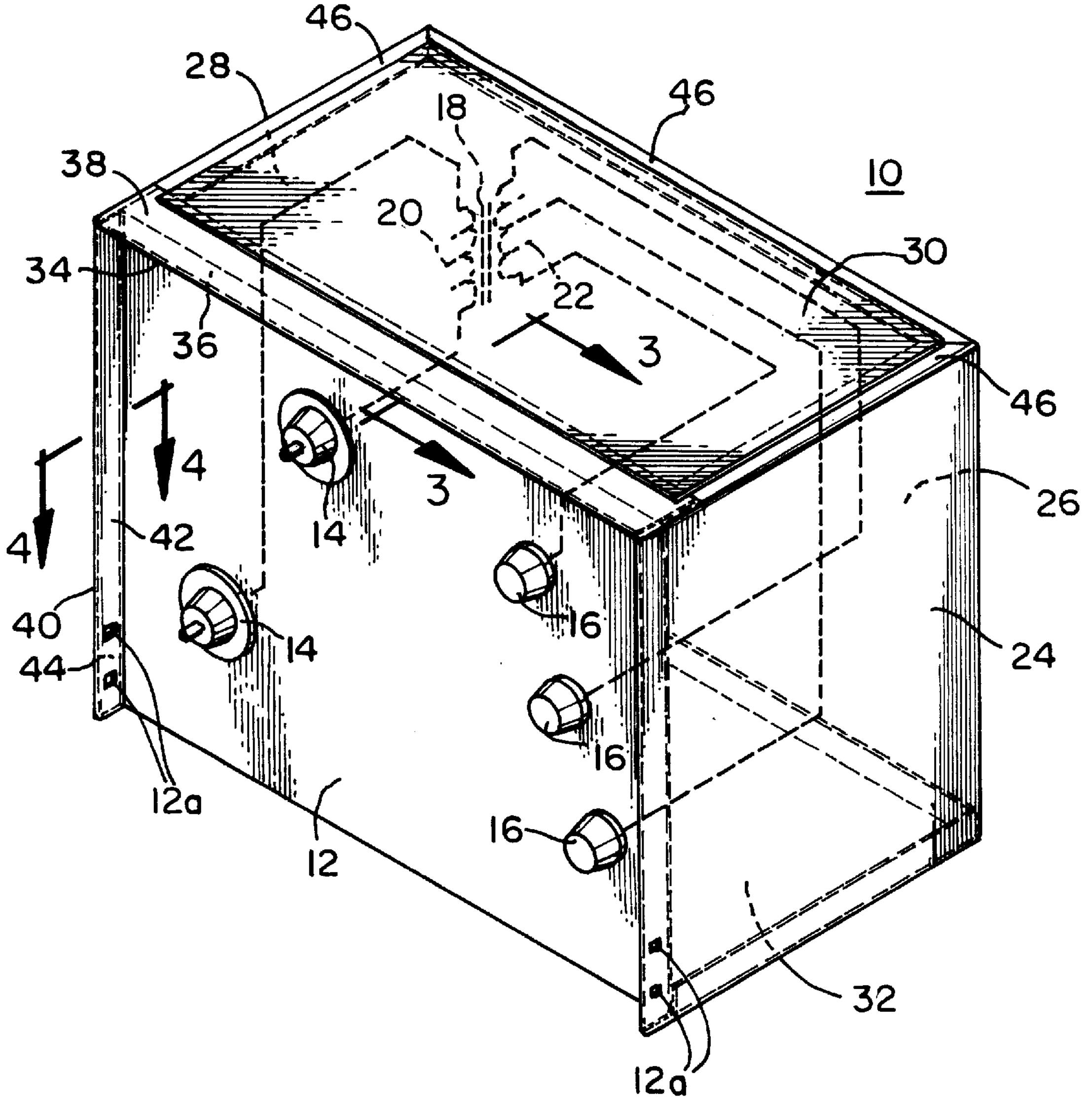
FIG. 1 is a perspective view of a top-loaded transformer tank embodying the present invention.

Referring to the drawings, it will be seen that in FIG. 1 there is illustrated a top-loaded tank 10 for a padmounted distribution transformer embodying the present invention. The enclosed metallic tank 10 has a front panel or terminal wall 12 on which electrical terminals are mounted, such as high voltage bushings 14 and low voltage bushings 16. A core-coil assembly 18 is disposed within the tank 10, immersed in a suitable liquid dielectric, such as mineral oil. The core-coil assembly 18 includes a primary winding 20 which is connected to the high voltage bushings 14 and a secondary winding 22 which is connected to the low voltage bushings 16. The tank 10 is formed in the shape of a rectangular cube and comprises four vertical sidewalls 12, 24, 26, 28, a horizontal top wall 30, hereinafter referred to as a tank cover, and a horizontal bottom wall 32, FIG. 2. In FIG. 1 of the four vertical sidewalls only the front panel or terminal wall 12 and the one side panel 24 may be seen along with the top wall or tank cover 30. The other side panel 28, back panel 26 and bottom panel 32 are not seen in FIG. 1.

Figure 2:
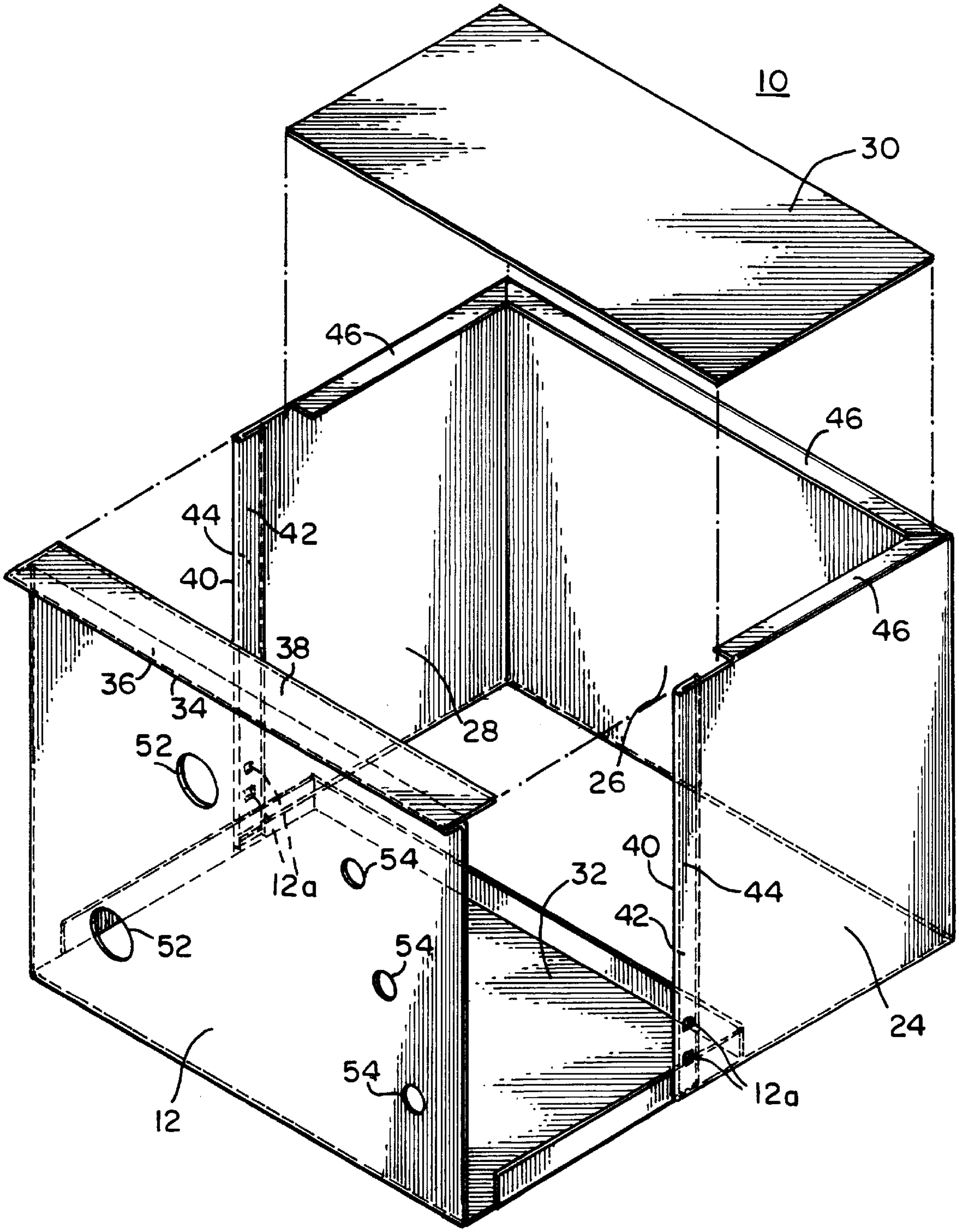
FIG. 2 is an exploded view of the tank shown in FIG. 1.
Figure 3:
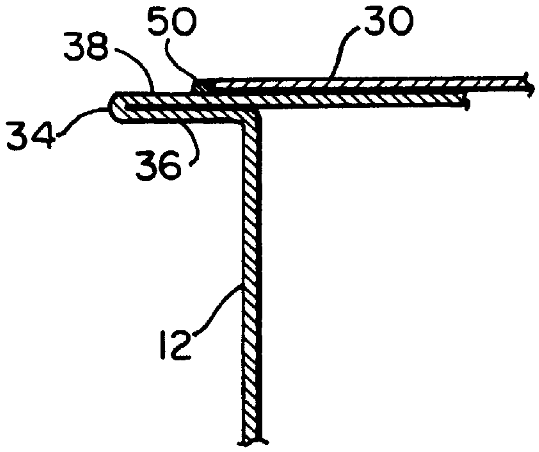
FIG. 3 is a fractional sectional view taken along the lines 3—3 in FIG. 1.

Referring to FIG. 2, which is an exploded perspective view of the tank 10, it will be seen that the tank may be constructed from three basic structural members. One of the members includes the front or terminal wall 12 and the bottom 32. The second structural member includes the sidewall 24, the rear wall 26 and the other sidewall 28 and the third structural member includes the tank top 30. The terminal wall 12 of the tank has a hem-bend 34 forming a flange extending along the top edge of the wall. The hem-bend 34 includes two layers of wall material 36 and 38 folded together and extending perpendicular to the terminal wall. The upper layer 38 of the hem-bend has a width greater than the lower layer 36 and extends to the opposite side of the terminal wall 12 from the hem-bend 34, FIG. 3. The bottom wall 32 is formed from the same structural member as the front panel 12 and is bent at right angles to the front panel as illustrated in FIG. 2. The side and back panels or walls 24–28 are formed from a single structural piece of metal and folded at the corners as illustrated in FIG. 2. The forward edges of the sidewalls to be connected to the terminal wall 12 are each provided with a hem-bend 40 forming a flange extending along the edge thereof adjacent the terminal wall. The hem-bend 40 on the sidewalls comprises two layers 42 and 44 of wall material folded together with the edge of one of the layers 42 engaging the outer surface of the terminal wall 12, FIG. 4. The upper edges of the walls 24–28 are provided with in-turned flange structure 46 to which the cover 30 is welded. As may be seen in FIG. 3 the cover 30 is welded to the upper layer 38 of the hem-bend 34 and the lower layer 36 of the hem-bend provides a heat-sink for the welded joint 50. The front panel 12, FIG. 2, is provided with openings 52 for receiving the high voltage bushings 14 and openings 54 for receiving the lower voltage bushings 16.

Figure 4:
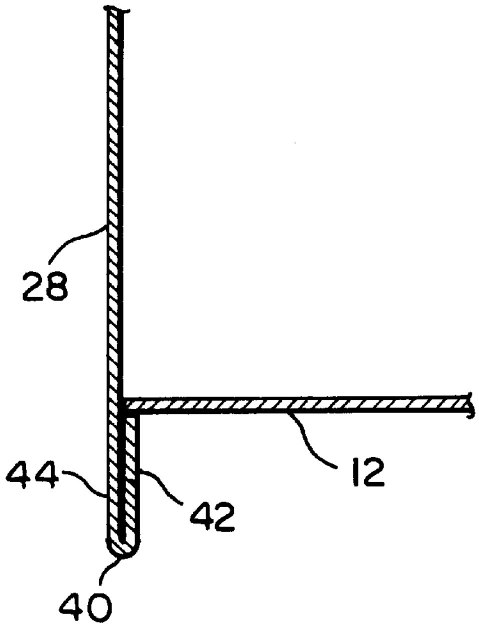
FIG. 4 is a sectional view taken along the lines 4—4 in FIG. 1.

In assembling the tank components, the terminal wall 12 and bottom 32 are mated with the side and back walls 24–28. The edge of the layers 42 engage the outer surface of the terminal wall 12 as shown in FIG. 4. The bottom 32 is welded to the lower edges of the walls 24–28. The tank is then painted. The electrical terminals 14 and 16 are the attached to the terminal wall 12, FIG. 1. The core-coil assembly 18 is placed within the tank 10 where it is immersed in a suitable liquid dielectric, not shown. The tank cover 30 is then welded to the in-turned flange structure 46 on the upper edges of the walls 24–28 and to the upper layer 38 of the hem-bend flange 34 on the terminal wall 12 wherein the lower layer 36 of the hembend flange 34 provides a heat-sink for the welded joint 50, FIG. 3, to protect the painted surface from the heat during the welding operation. To complete the transformer, the tank 10 is normally provided with a compartment or cabinet for enclosing the electrical bushings 14 and 16 on the front of the terminal wall 12. An example of such cabinet is disclosed in the aforesaid patent 4,559,699, the disclosure of which is incorporated herein by this reference thereto. Briefly, the cabinet includes a terminal cover or hood, not shown, which is pivotally attached by hinges to the flange on the front terminal wall 12. The lower end of the cabinet includes a U-shaped sill, not shown, which is attached to the lower end of the terminal wall 12 as indicated by the bolt holes 12*a*, FIGS. 1 and 2. The lower end of the terminal cover or hood rests on the upper edge of the sill as shown in the aforesaid patent 4,559,699. The construction of the hood and sill are well known in the art and thus have not been illustrated in this application.

Figure 5:
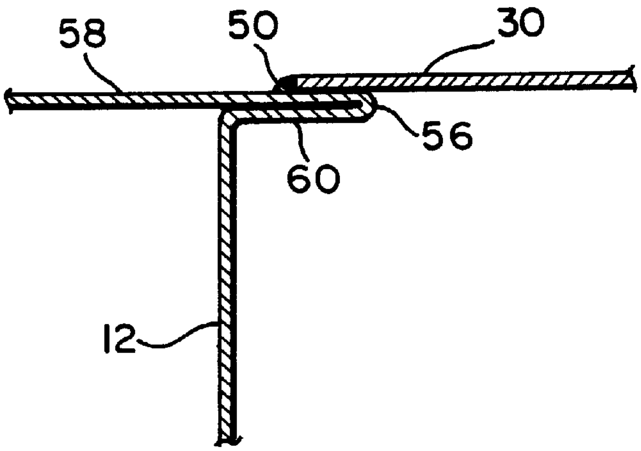
FIG. 5 is a sectional view similar to FIG. 3 of a modification of the invention.

Referring to FIG. 5 there is illustrated a modification of the hem-bend flange for the front panel 12. In FIG. 5 it will be seen that the hem-bend 56 projects into the inside of the transformer tank and the upper layer 58 of the hem-bend extends outside of the transformer tank beyond the outer surface of the terminal wall 12.

From the foregoing it will be seen that the hem-bend flanges 34 and 56 act as a heat seal to protect the painted surface of the tank during the welding operation. It will also be seen that the hem-bend flanges 34, 40 and 56 also increase the structural strength of the tank flange.

While a preferred embodiment of this invention has been illustrated, it is to be understood that other modifications thereof may be made within the scope of the appended claims.

What is claimed is:

1. In a padmounted distribution transformer including a top-loaded tank having terminals on an outer surface of a recessed terminal wall, the improvement wherein the terminal wall of said tank has a hem-bend forming a flange extending along the top edge of said wall, said hem-bend comprising two layers of wall material folded together and extending perpendicular to the terminal wall, an upper layer of said hem-bend having a width greater than a lower layer and extending to an opposite side of said terminal wall from said hem-bend, and a tank cover welded to the upper layer of said hem-bend wherein said lower layer of said hem-bend provides a heat-sink a welded joint between said tank cover and said upper layer joint.

2. In a padmounted distribution transformer, the improvement according to claim 1 wherein said hem-bend projects into an interior of said tank and said upper layer of said hem-bend extends outside of the transformer, tank beyond the outer surface of said terminal wall.

3. In a padmounted distribution transformer, the improvement according to claim 1 wherein said hem-bend extends outside of the tank beyond the outer surface of said terminal wall and said upper layer of said hem-bend extends inside of said tank.

4. In a padmounted distribution transformer, the improvement according to claim 1 wherein said top-loaded tank includes a pair of sidewalls, connected to said terminal wall, at least one of said sidewalls including a hem-bend forming a flange extending along an edge thereof adjacent said terminal wall, said hem-bend on said at least sidewalls one of said comprising two layers of wall material folded together with an edge of one of said layers engaging the outer surface of said terminal wall wherein said hem-bends increase the structural strength of the tank.

5. In a padmounted distribution transformer, the improvement according to claim 4 wherein both of said sidewalls of said tank include a hem-bend having an edge engaging the outer surface of said terminal wall.

* * * * *

UNITED STATES PATENT AND TRADEMARK OFFICE

CERTIFICATE OF CORRECTION

PATENT NO. : 6,114,624

DATED : September 5, 2000

INVENTOR(S) : Ali A. Ghafourian et al.

It is certified that error appears in the above-indentified patent and that said Letters Patent is hereby corrected as shown below:

Col. 4, (claim 1), line 53, after "heat-sink" insert --for--;
at line 54, delete the word "joint" so that lines 53 and 54 read --provides a heat-sink for a welded joint between said tank cover and said upper layer.--

Col. 5, (claim 4), line 3, delete "said at least sidewalls one of said comprising two layers" and replace it with:
--said at least one of said sidewalls comprising two layers--

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*